(12) United States Patent
Awana et al.

(10) Patent No.: US 10,518,779 B2
(45) Date of Patent: Dec. 31, 2019

(54) INHIBITING HIGH SPEED DIRECTIONAL SHIFTS BASED ON WHETHER CONTROLLED THROTTLE SHIFTING IS ENABLED OR DISABLED

(71) Applicant: Caterpillar Inc., Peoria, IL (US)

(72) Inventors: Abhishek Awana, Dunlap, IL (US); Aaron Y. Ho, Naperville, IL (US); Michael K. Schallhorn, Peoria, IL (US); Jeremy Folkerts, Naperville, IL (US)

(73) Assignee: Caterpilliar Inc., Peoria, IL (US)

( * ) Notice: Subject to any disclaimer, the term of this patent is extended or adjusted under 35 U.S.C. 154(b) by 27 days.

(21) Appl. No.: 15/940,367

(22) Filed: Mar. 29, 2018

(65) Prior Publication Data

US 2019/0299994 A1 Oct. 3, 2019

(51) Int. Cl.
*B60W 30/188* (2012.01)
*B60W 10/10* (2012.01)
*B60W 10/06* (2006.01)
*F16H 61/16* (2006.01)

(52) U.S. Cl.
CPC ......... *B60W 30/188* (2013.01); *B60W 10/06* (2013.01); *B60W 10/10* (2013.01); *F16H 61/16* (2013.01); *B60W 2300/17* (2013.01); *B60W 2510/104* (2013.01); *B60W 2520/10* (2013.01); *B60W 2710/0644* (2013.01); *B60W 2710/1005* (2013.01); *F16H 2061/165* (2013.01)

(58) Field of Classification Search
None
See application file for complete search history.

(56) References Cited

U.S. PATENT DOCUMENTS

| 4,768,636 | A | 9/1988 | Ito et al. |
| 5,583,766 | A | 12/1996 | Birchenough et al. |
| 5,893,294 | A | 4/1999 | Hosseini et al. |
| 6,413,189 | B1 | 7/2002 | Spiess et al. |
| 8,364,358 | B2 | 1/2013 | Ishikawa et al. |
| 9,689,490 | B2 | 6/2017 | Patenaude et al. |
| 2008/0242502 | A1* | 10/2008 | Lin ..................... B60W 10/023 477/80 |
| 2013/0166171 | A1* | 6/2013 | Hartman ............... B60W 10/06 701/102 |
| 2017/0274770 | A1* | 9/2017 | Aoki ....................... F16H 59/18 |

* cited by examiner

*Primary Examiner* — Justin Holmes
(74) *Attorney, Agent, or Firm* — Harrity & Harrity LLP; Jeff A. Greene (57) ABSTRACT

A transmission control system for a machine is disclosed. The transmission control system may determine whether engine speed regulation during gear shift is enabled or disabled for the machine. The transmission control system may select a speed threshold, for inhibiting a high speed directional shift of the machine, based on whether the engine speed regulation during gear shift is enabled or disabled for the machine. The transmission control system may compare a speed of the machine and the speed threshold, and may selectively inhibit the high speed directional shift for the machine based on comparing the speed of the machine and the speed threshold.

20 Claims, 4 Drawing Sheets

INHIBITING HIGH SPEED DIRECTIONAL SHIFTS BASED ON WHETHER CONTROLLED THROTTLE SHIFTING IS ENABLED OR DISABLED

TECHNICAL FIELD

The present disclosure relates generally to a transmission control system in a work machine and, more particularly, to a transmission control system for inhibiting high speed directional shifts based on whether controlled throttle shifting is enabled or disabled.

BACKGROUND

A work machine may include a transmission coupled to a power source, such as an internal combustion engine or an electric motor, to provide more flexible use of the power output by the power source. For example, the transmission may provide a number of gear ratios that enable the work machine to travel at a relatively wide range of speeds or conditions that might be impractical without a transmission. In some work machine applications, the transmission may provide a directional shifting capability, also known as "shuttle shifting," that permits the operator to command a machine direction reversal (e.g., by shifting a lever). The transmission may respond to this command by causing the work machine to slow down and change direction, and may alleviate the need for the operator to press a brake and stop the machine, move the transmission shifter from forward to reverse or vice versa, and press the accelerator.

To perform a directional shift, energy is required to decelerate the machine in a current travel direction, and then accelerate the machine in the opposite direction. Similarly, energy is required to upshift, downshift, or otherwise change the velocity of the machine. Much of the energy required for the change in the machine's velocity is provided by the clutches within the transmission. The energy requirement may cause heat to be generated at the transmission clutches during the directional shift, and can result in clutch failure when the clutch temperature repeatedly exceeds the material durability limits of the clutch components.

One attempt to limit clutch temperatures within a transmission during high speed shifts is disclosed in U.S. Pat. No. 9,689,490 that issued to Patenaude et al. on Jun. 27, 2017 ("the '490 patent"). In particular, the '490 patent discloses a machine velocity change shift strategy that determines acceptable transmission output shaft velocity changes that require less energy to execute the directional shift and reverse the direction of travel of a work machine so that the oil temperature within the transmission will not reach levels that compromise the clutch glue or otherwise adversely affect the components of the transmission. The machine velocity change shift strategy disclosed in the '490 patent factors in changes in the grade of the work surface, the mass of the work machine, and the temperature of the transmission oil to adjust the energy required for the directional shift and the acceptable transmission output shaft velocity change that can vary with these parameters.

However, there may be additional factors or parameters that may impact a machine velocity shift strategy, such as whether controlled throttle shifting, which may regulate an engine speed during gear shift, is enabled or disabled for the work machine. The transmission control system of the present disclosure solves one or more of the problems set forth above and/or other problems in the art.

SUMMARY

According to some aspects, the present disclosure is related to a transmission control system for a machine. The transmission control system may include one or more processors. The one or more processors may determine whether engine speed regulation during gear shift is enabled or disabled for the machine. The one or more processors may select a speed threshold, for inhibiting a high speed directional shift of the machine, based on whether the engine speed regulation during gear shift is enabled or disabled for the machine. The one or more processors may compare a speed of the machine and the speed threshold, and may selectively inhibit the high speed directional shift for the machine based on comparing the speed of the machine and the speed threshold.

According to some aspects, the present disclosure is related to a method performed by a transmission control system. The method may include determining whether engine speed regulation during gear shift is enabled or disabled, and selecting a speed threshold, for inhibiting a high speed directional shift, based on whether the engine speed regulation during gear shift is enabled or disabled. The method may include determining that a machine speed satisfies the speed threshold, and inhibiting the high speed directional shift based on determining that the machine speed satisfies the speed threshold.

According to some aspects, the present disclosure is related to a machine. The machine may include an engine, an engine control unit to control the engine, a transmission, and a transmission control system to control the transmission. The transmission control system may be configured to determine whether engine speed regulation during gear shift is enabled or disabled for the machine. The transmission control system may be configured to select a speed threshold, for inhibiting a high speed directional shift of the machine, based on whether the engine speed regulation during gear shift is enabled or disabled for the machine. The speed threshold may be a first speed threshold when the engine speed regulation during gear shift is enabled, or the speed threshold may be a second speed threshold when the engine speed regulation during gear shift is disabled. The transmission control system may be configured to compare a speed of the machine and the speed threshold, and to inhibit the high speed directional shift for the machine based on comparing the speed of the machine and the speed threshold.

DETAILED DESCRIPTION

This disclosure relates to a transmission control system. The transmission control system has universal applicability to any machine utilizing such a transmission control system. The term "machine" may refer to any machine that performs an operation associated with an industry such as, for example, mining, construction, farming, transportation, or any other industry. As some examples, the machine may be a vehicle, a dozer (e.g., a wheel dozer, a bulldozer, and/or the like), a wheel loader, a compactor, a backhoe loader, a cold planer, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a tractor scraper, or other paving or underground mining equipment. Moreover, one or more implements may be connected to the machine and driven from the transmission control system.

Figure 1:
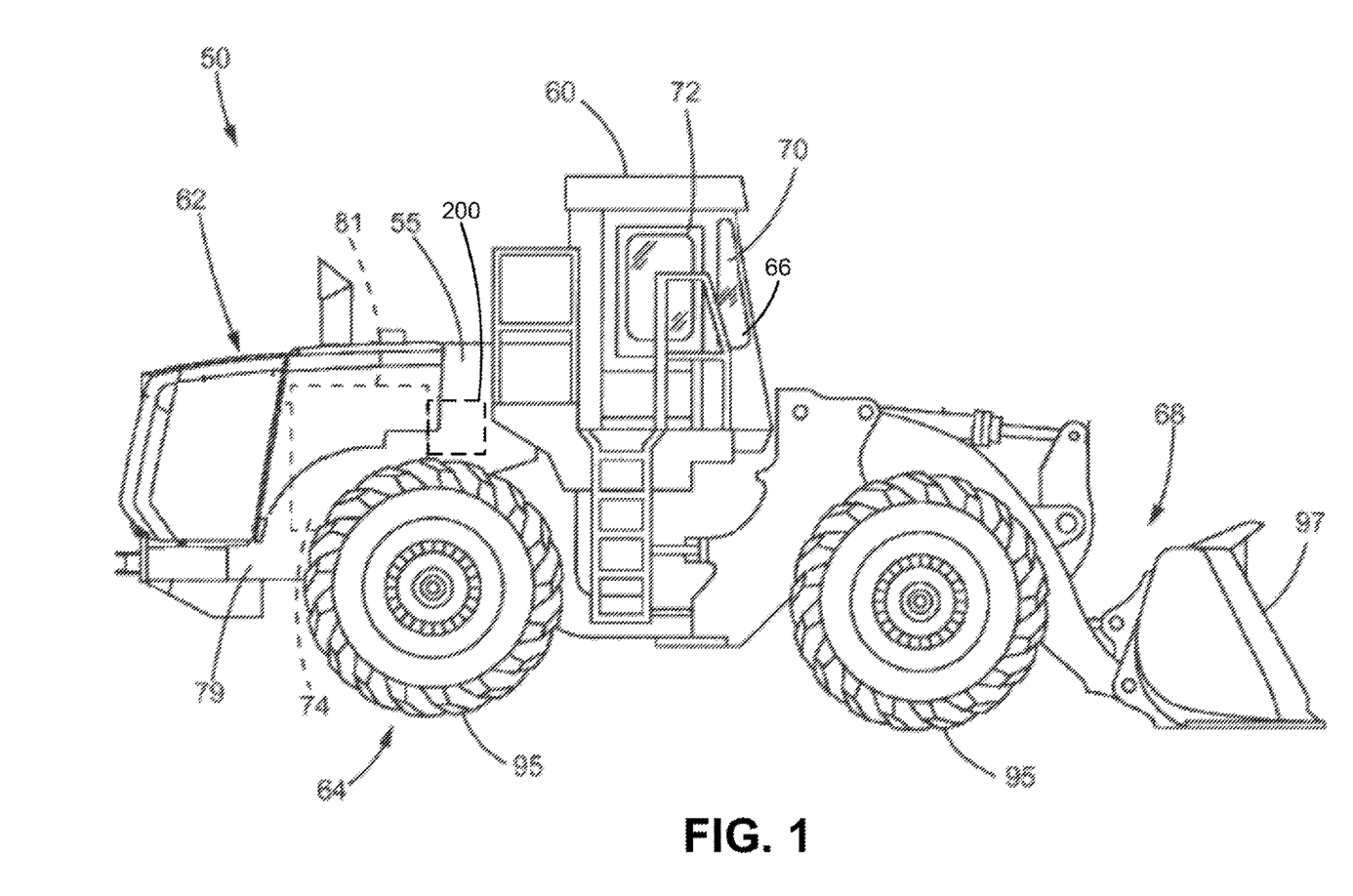
FIG. 1 is a diagram of an example machine that includes a transmission control system.

FIG. 1 is a diagram of an example machine 50 that includes a transmission control system 200. The machine 50 is shown as a wheel loader, but may include any type of machine that includes a transmission control system capable of inhibiting high speed directional shifts based on whether controlled throttle shifting (e.g., engine speed regulation during gear shift) is enabled or disabled, such as a wheel dozer, a compactor, and/or the like. As shown, the machine 50 may have a frame 55 that supports an operator station 60, a power system 62, a drive system 64, and an implement system 68. The operator station 60 may include operator controls 66 for operating the machine 50 via the power system 62. The illustrated operator station 60 is configured to define an interior cabin 70 within which the operator controls 66 are housed and which is accessible via a door 72.

The power system 62 is configured to supply power to the machine 50. The power system 62 may be operably arranged with the operator station 60 to receive control signals from the operator controls 66 in the operator station 60. Additionally, or alternatively, the power system 62 may be operably arranged with the drive system 64 and/or the implement system 68 to selectively operate the drive system 64 and/or the implement system 68 according to control signals received from the operator controls 66. The power system 62 may provide operating power for the propulsion of the drive system 64 and/or the operation of the implement system 68. The power system 62 may include an engine 81, for example.

The drive system 64 may be operably arranged with the power system 62 to selectively propel the machine 50 via control signals from the operator controls 66. The drive system 64 can include a plurality of ground-engaging members, such as wheels 95, as shown, which can be movably connected to the frame 55 through axles, drive shafts, and/or other components. In some implementations, the drive system 64 may be provided in the form of a track-drive system, a wheel-drive system, or any other type of drive system configured to propel the machine 50.

The implement system 68 may be operably arranged with the power system 62 such that the implement system 68 is selectively movable through control signals transmitted from the operator controls 66 to the power system 62. The illustrated implement 97 is a bucket. Other embodiments can include any other suitable implement for a variety of tasks, including, for example, dozing, brushing, compacting, grading, lifting, loading, plowing, ripping, and/or the like. Example implements include dozers, augers, blades, breakers/hammers, brushes, compactors, cutters, forked lifting devices, grader bits and end bits, grapples, blades, rippers, and/or the like.

A rear portion 79 of the frame 55 may include the engine 81 and a transmission 74. The engine 81 may be any type of engine suitable for performing work using the machine 50, such as an internal combustion engine, a diesel engine, a gasoline engine, a gaseous fuel-powered engine, and/or the like. The transmission 74 may transfer power from the engine 81 to the drive system 64 and/or the implement system 68. The transmission 74 may provide a number of gear ratios that enable the machine 50 to travel at a relatively wide range of speeds and/or conditions via the drive system 64, and/or that enable the use of the implement system 68 to perform work.

In some implementations, the transmission 74 may provide a directional shifting capability (e.g., shuttle shifting and/or the like) that permits the operator to command a machine direction reversal using operator controls 66, such as by shifting a lever and without pressing a brake or an accelerator. The directional shifting capability may permit the operator to command the machine 50 to shift from traveling in a particular direction at a particular speed to an opposite direction at the same speed (e.g., after the machine 50 slows down and reverses direction). The transmission 74 may respond to this command by causing the machine 50 to slow down and change direction, and may alleviate the need for the operator to press a brake and stop the machine 50, move the transmission shifter (e.g., an operator control 66) from forward to reverse or vice versa, and press the accelerator. In some implementations, the directional shifting capability may be provided by an operator control 66 that includes a directional shifter (e.g., a lever and/or the like).

The machine 50 may include a transmission control system 200 to control the transmission 74. For example, the transmission control system 200 may inhibit directional shifting at high speeds (e.g., speeds greater than a threshold), which may be referred as high speed directional shifting. Additionally, or alternatively, the transmission control system 200 may regulate an engine speed during a gear shift (e.g., by sending a signal to the engine 81 and/or an engine control unit to slow down to a threshold speed during a gear shift), which may be referred to as controlled throttle shifting, engine speed regulation during gear shift, and/or the like. In some implementations, the transmission control system 200 may use different machine speed thresholds to inhibit high speed directional shifting based on whether engine speed regulation during gear shift is enabled or disabled for the machine 50, as described in more detail below.

As indicated above, FIG. 1 is provided as an example. Other examples are possible and may differ from what was described in connection with FIG. 1.

Figure 2:
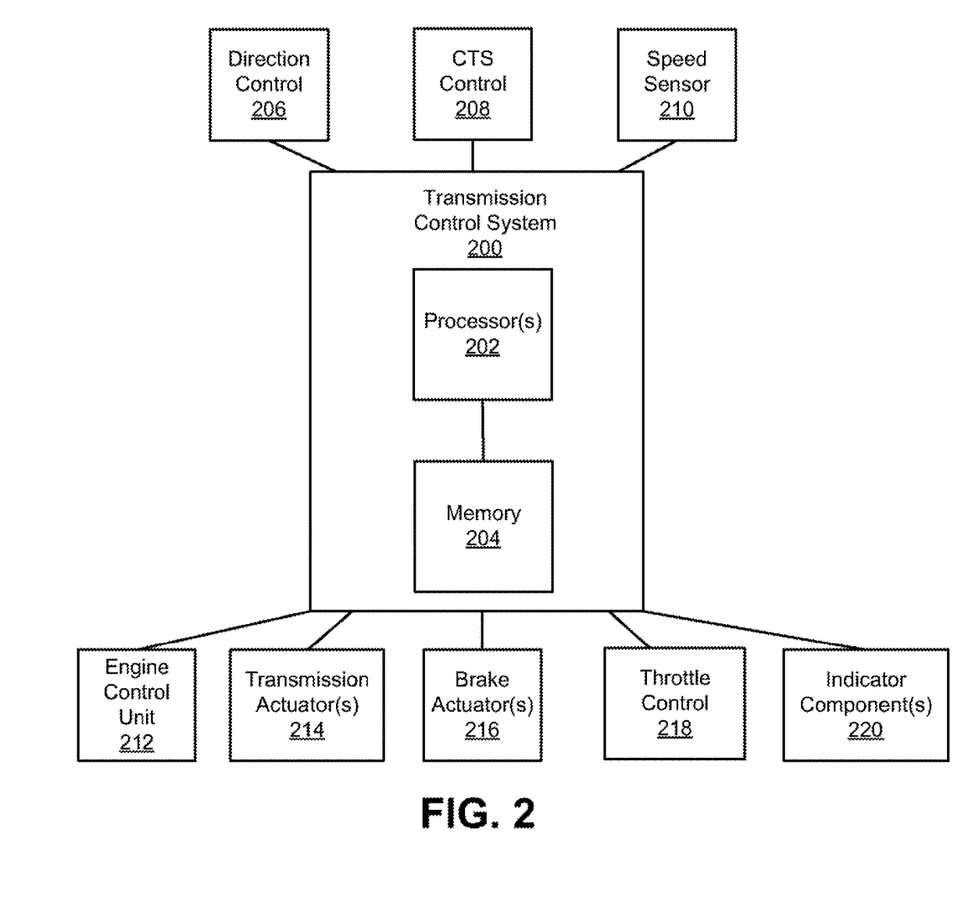
FIG. 2 is a diagram of an example transmission control system and associated components.

FIG. 2 is a diagram of an example transmission control system 200 and associated components that may interact with the transmission control system 200.

The transmission control system 200 includes one or more processors 202 (e.g., a microprocessor, a microcontroller, a field-programmable gate array (FPGA), an application-specific integrated circuit (ASIC), and/or the like) and memory 204 (e.g., read-only memory (ROM), random-access memory (RAM), and/or the like). In some implementations, the transmission control system 200 may be an electronic control unit of the machine 50. The processor 202 may execute one or more instructions and/or commands to control one or more components of machine 50, such as to inhibit a high speed directional shift based on whether controlled throttle shifting is enabled or disabled. The memory 204 may store program code for execution by the processor 202 and/or for storing data in connection with execution of such program code by the processor 202.

The transmission control system 200 may receive one or more input signals from various components of machine 50, may operate on the one or more input signals to generate one or more outputs signals (e.g., by executing a program using the input signals as input to the program), and may output the one or more output signals to various components of machine 50. For example, the transmission control system 200 may be electronically connected (e.g., via wired or wireless connection) to one or more operator controls 66, such as a direction control 206, a controlled throttle shifting (CTS) control 208, and/or the like, and may receive input from these operator controls 66.

The direction control 206 is used by the operator to control a direction of movement of the machine 50. The direction control 206 may include, for example, a gear shift, a Forward-Neutral-Reverse (F-N-R) selection switch, a shuttle shifter, a directional shifter, and/or the like. In some implementations, the direction control 206 may be used to command a direction shift without requiring the operator to press a brake and stop the machine 50, move a transmission shifter from forward to reverse or vice versa, and press an accelerator. In this case, the direction control 206 may cause the machine 50 to shift from traveling in a particular direction at a particular speed to an opposite direction at the same speed (e.g., after the machine 50 slows down and reverses direction).

The CTS control 208 may be used by the operator to control whether engine speed regulation during gear shift is enabled or disabled for the machine 50. If engine speed regulation during gear shift is enabled, then the transmission control system 200 may regulate a speed of engine 81 during a gear shift. For example, the transmission control system 200 may send an output signal to the engine 81 and/or an engine control unit (ECU) 212 to slow down to a particular speed during a gear shift. If engine speed regulation during gear shift is disabled, then the transmission control system 200 may not regulate a speed of engine 81 during a gear shift. For example, the transmission control system 200 may not send an output signal to the engine 81 and/or an engine control unit 212 to slow down to a particular speed during a gear shift.

The transmission control system 200 may be electronically connected (e.g., via wired or wireless connection) to one or more sensors, such as a speed sensor 210 and/or the like, and may receive input from these sensor(s). A sensor may indicate a real-time operating condition of machine 50. The speed sensor 210 may measure a speed of the machine 50, which may correspond to a ground speed of the machine 50, a transmission output speed (TOS), and/or the like. In some implementations, the speed sensor 210 may be capable of converting a ground speed of the machine 50 to a TOS or vice versa, depending on a speed parameter on which the transmission control system 200 operates (e.g., when executing a program).

The transmission control system 200 may be electronically connected (e.g., via wired or wireless connection) to one or more output devices to which the transmission control system 200 transmits output signals (e.g., control signals). For example, the transmission control system 200 may transmit control signals to an engine control unit 212, one or more transmission actuators 214, one or more brake actuators 216, a throttle control 218, one or more indicator components 220, and/or the like.

The engine control unit 212 may control a speed and/or other parameters of the engine 81. The transmission actuator(s) 214 may control one or more clutches of the transmission 74 to switch between available gears and/or change directions. The brake actuator(s) 216 may cause hydraulic fluid to flow to braking devices to engage and reduce the speed of the machine 50. The throttle control 218 may enable or disable control signals from a throttle (e.g., an accelerator pedal and/or the like), such as to override the throttle. The indicator component(s) 220 may output a visual, audible, or haptic indicator to an operator to indicate a work condition of the machine 50 (e.g., a current gear being using by the transmission 74, a current engine speed, a current TOS, whether CTS is enabled or disabled, whether a directional shift is being inhibited, and/or the like). One or more of these output devices may operate based on one or more control signals received from the transmission control system 200.

As indicated above, FIG. 2 is provided as an example. Other examples are possible and may differ from what was described in connection with FIG. 2.

Figure 3:
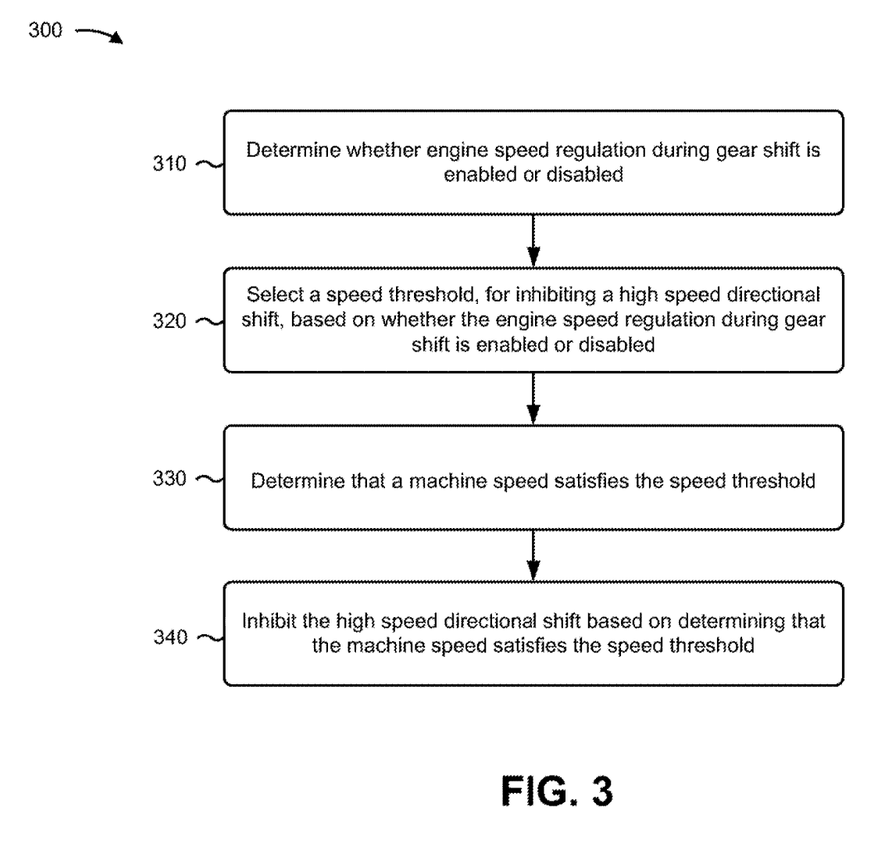
FIG. 3 is a diagram of an example process for inhibiting high speed directional shifts based on whether controlled throttle shifting is enabled or disabled.

FIG. 3 is a diagram of an example process 300 for inhibiting high speed directional shifts based on whether controlled throttle shifting is enabled or disabled. In some implementations, process 300 may be performed by transmission control system 200.

As shown in FIG. 3, process 300 may include determining whether engine speed regulation during gear shift is enabled or disabled (block 310). For example, the transmission control system 200 (e.g., using processor 202) may determine whether engine speed regulation during gear shift is enabled or disabled based on an input signal received from CTS control 208 and/or stored in memory 204. In some implementations, the transmission control system 200 may determine that a direction shift has been requested based on an input signal received from the direction control 206, and may then determine whether the engine speed regulation during gear shift (e.g., CTS) is enabled or disabled.

As further shown in FIG. 3, process 300 may include selecting a speed threshold, for inhibiting a high speed directional shift, based on whether the engine speed regulation during gear shift is enabled or disabled (block 320). For example, the transmission control system 200 (e.g., using processor 202 and/or one or more rules stored in memory 204) may select a speed threshold for inhibiting a high speed directional shift. The speed threshold may be selected based on whether the engine speed regulation during gear shift is enabled or disabled.

For example, the transmission control system 200 may select a first speed threshold when the engine speed regulation during gear shift is enabled, or may select a second speed threshold when the engine speed regulation during gear shift is disabled. The first speed threshold may be different from the second speed threshold. For example, the first speed threshold may be greater than the second speed threshold. As an example, the first speed threshold may be 5% to 50% greater than the second speed threshold. In some implementations, the first speed threshold and the second speed threshold may be stored in memory 204 in association with an indication of a condition in which the first speed threshold or the second speed threshold is to be selected (e.g., based on whether CTS is enabled or disabled).

As further shown in FIG. 3, process 300 may include determining that a machine speed satisfies the speed threshold (block 330). For example, the transmission control system 200 (e.g., using processor 202 and/or memory 204) may determine that a machine speed of machine 50 (e.g., a ground speed, a TOS, and/or the like) satisfies the selected speed threshold (e.g., is greater than the speed threshold). In some implementations, the transmission control system 200 may receive an input signal that indicates the machine speed, and/or may determine the machine speed based on an input signal, such as an input signal (e.g., a speed signal) from speed sensor 210. The transmission control system 200 may compare the machine speed and the speed threshold (e.g., stored in memory 204), and may determine whether the machine speed is greater than, less than, or equal to the speed threshold.

As further shown in FIG. 3, process 300 may include inhibiting the high speed directional shift based on determining that the machine speed satisfies the speed threshold (block 340). For example, the transmission control system 200 (e.g., using processor 202) may inhibit the high speed directional shift based on determining that the machine speed satisfies the speed threshold, such as by transmitting one or more control signals to one or more output devices, as described above in connection with FIG. 2.

In some implementations, the transmission control system 200 may transmit a control signal (e.g., a limit signal) to cause the ECU 212 to inhibit the high speed directional shift by reducing a speed of the engine 81. In some implementations, the transmission control system 200 may indicate the speed threshold to the ECU 212, and the ECU 212 may reduce a speed of the engine 81 to the speed threshold, which may be a different speed threshold depending on whether CTS is enabled or disabled. Additionally, or alternatively, the transmission control system 200 may inhibit the high speed directional shift by overriding a throttle (e.g., by transmitting an override signal to throttle control 218). In some implementations, the transmission control system 200 may inhibit the high speed directional shift until the machine speed is less than or equal to the speed threshold, at which time the transmission control system 200 may instruct one or more output devices (e.g., transmission actuators 214, brake actuators 216, and/or the like) to perform the direction shift.

In some implementations, the transmission control system 200 may transmit an output signal to an indicator component 220 (e.g., a display, a speaker, an indicator light, and/or the like) to cause the indicator component 220 to indicate (e.g., to an operator) that the high speed directional shift is being inhibited.

In some implementations, the transmission control system 200 may determine that the machine speed does not satisfy the speed threshold (e.g., is less than or equal to the speed threshold). In this case, the transmission control system 200 may not inhibit the high speed directional shift, and may instruct one or more output devices to perform the direction shift. Thus, the transmission control system 200 may selectively inhibit (e.g., may inhibit or not inhibit) the high speed directional shift based on whether the machine speed satisfies the selected speed threshold.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
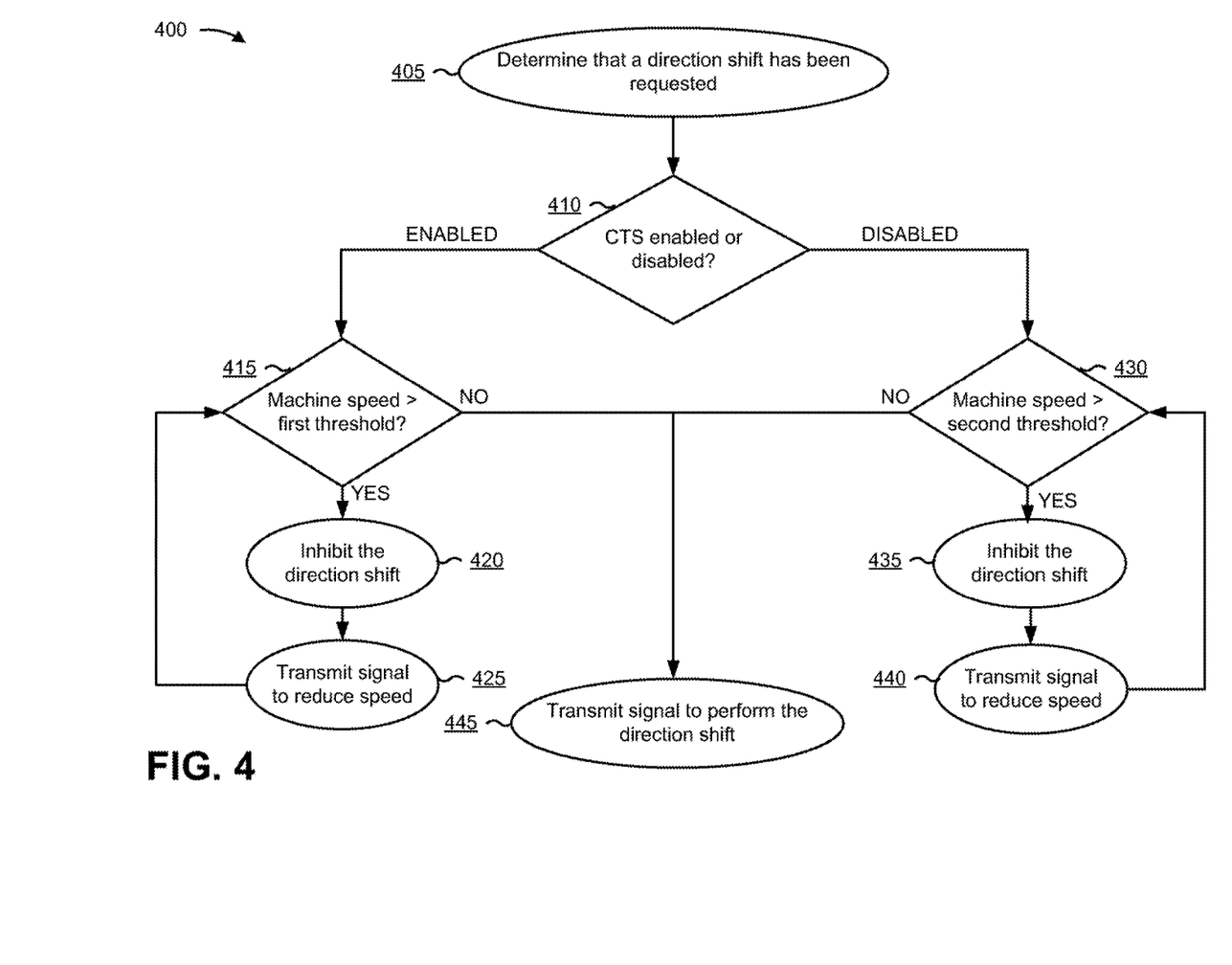
FIG. 4 is a diagram of another example process for inhibiting high speed directional shifts based on whether controlled throttle shifting is enabled or disabled.

FIG. 4 is a diagram of an example process 400 for inhibiting high speed directional shifts based on whether controlled throttle shifting is enabled or disabled. In some implementations, process 400 may be performed by transmission control system 200.

As shown in FIG. 4, the transmission control system 200 may determine that a direction shift has been requested (block 405), and may then determine whether CTS (e.g., engine speed regulation during gear shift) is enabled of disabled (block 410).

If CTS is enabled (block 410—ENABLED), then the transmission control system 200 may determine whether the machine speed is greater than a first threshold (block 415). If the machine speed is greater than the first threshold (block 415—YES), then the transmission control system 200 may inhibit the direction shift (block 420), may transmit a signal to reduce speed (block 425), and may return to block 415 to again determine whether the machine speed is greater than the first threshold. If the machine speed is not greater than the first threshold (block 415-NO), then the transmission control system 200 may transmit a signal to perform the direction shift (block 445).

If CTS is disabled (block 410—DISABLED), then the transmission control system 200 may determine whether the machine speed is greater than a second threshold (block 430). If the machine speed is greater than the second threshold (block 430—YES), then the transmission control system 200 may inhibit the direction shift (block 435), may transmit a signal to reduce speed (block 440), and may return to block 430 to again determine whether the machine speed is greater than the second threshold. If the machine speed is not greater than the second threshold (block 430-NO), then the transmission control system 200 may transmit a signal to perform the direction shift (block 445).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The transmission control system 200 may be used with any machine 50 that permits an operator to interact with operator controls 66 to enable or disable engine speed regulation during gear shift (e.g., CTS), such as a wheel dozer, a wheel loader, a compactor, and/or the like. During operation of the machine 50, engine speed is reduced to perform a directional shift (e.g., from forward to reverse or from reverse to forward). In some operating conditions, such as when there is a heavy load on the machine 50 and/or the machine 50 is operating on a steep grade (e.g., 20% or more), engine speed may be further reduced during a directional shift. Furthermore, some techniques designed to improve transmission durability and/or machine performance, such as CTS and/or high speed directional shift inhibition, may further reduce engine speed of the machine 50 by preventing directional shifts from occurring until TOS is reduced to a certain level. As a result, in some operating conditions, the engine 81 may have an increased likelihood of stalling.

Techniques described herein, which trigger directional shift inhibition differently based on whether CTS is enabled or disabled, may reduce the likelihood of stalling the engine 81, particularly when the machine 50 is operating with a heavy load and/or on a steep grade. Furthermore, these techniques may improve durability of the transmission 74, leading to longer transmission life, by reducing or preventing transmission clutch damage when CTS is disabled. These techniques also balance machine performance and transmission durability, while permitting an operator to flexibly control a manner in which the machine 50 operates (e.g., via enabling or disabling CTS).

As used herein, the articles "a" and "an" are intended to include one or more items, and may be used interchangeably with "one or more." Also, as used herein, the terms "has,"

"have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A transmission control system for a machine, comprising:
one or more processors configured to:
determine when engine speed regulation during gear shift is enabled or disabled for the machine;
select a speed threshold, for inhibiting a directional shift of the machine, based on when the engine speed regulation during gear shift is enabled or disabled for the machine;
compare a speed of the machine and the speed threshold; and
selectively inhibit the directional shift for the machine based on comparing the speed of the machine and the speed threshold.

2. The transmission control system of claim 1, wherein the one or more processors, when selecting the speed threshold, are configured to:
select a first speed threshold when the engine speed regulation during gear shift is enabled, or
select a second speed threshold when the engine speed regulation during gear shift is disabled, wherein the second speed threshold is different from the first speed threshold.

3. The transmission control system of claim 2, wherein the first speed threshold is greater than the second speed threshold.

4. The transmission control system of claim 1, wherein the directional shift is inhibited when the speed of the machine is greater than the speed threshold.

5. The transmission control system of claim 1, wherein the one or more processors, when selectively inhibiting the directional shift, are configured to:
inhibit the directional shift until the speed of the machine is less than or equal to the speed threshold.

6. The transmission control system of claim 1, wherein the one or more processors, when selectively inhibiting the directional shift, are configured to:
inhibit the directional shift by at least one of:
transmitting a limit signal to an engine control unit, or overriding a throttle.

7. The transmission control system of claim 1, wherein the speed of the machine is determined based on a transmission output speed.

8. A method performed by a transmission control system, comprising:
determining when engine speed regulation during gear shift is enabled or disabled;
selecting a speed threshold, for inhibiting a directional shift, based on when the engine speed regulation during gear shift is enabled or disabled;
determining that a machine speed satisfies the speed threshold; and
inhibiting the directional shift based on determining that the machine speed satisfies the speed threshold.

9. The method of claim 8, wherein selecting the speed threshold comprises:
selecting a first speed threshold when the engine speed regulation during gear shift is enabled, or
selecting a second speed threshold when the engine speed regulation during gear shift is disabled, wherein the first speed threshold is greater than the second speed threshold.

10. The method of claim 9, wherein the first speed threshold is 5% to 50% greater than the second speed threshold.

11. The method of claim 8, wherein inhibiting the directional shift comprises transmitting a signal to cause an engine control unit (ECU) to inhibit the directional shift.

12. The method of claim 8, wherein inhibiting the directional shift comprises waiting to perform the directional shift until the machine speed is less than or equal to the speed threshold.

13. The method of claim 8, wherein the machine speed is determined based on a speed signal received from a speed sensor.

14. The method of claim 8, wherein determining when the engine speed regulation during gear shift is enabled or disabled comprises:
determining that a direction shift has been requested; and
determining when the engine speed regulation during gear shift is enabled or disabled based on determining that the direction shift has been requested.

15. A machine, comprising:
an engine;
an engine control unit to control the engine;
a transmission; and
a transmission control system to control the transmission, wherein the transmission control system is configured to:
determine when engine speed regulation during gear shift is enabled or disabled for the machine;
select a speed threshold, for inhibiting a directional shift of the machine, based on when the engine speed regulation during gear shift is enabled or disabled for the machine, wherein the speed threshold is a first speed threshold when the engine speed regulation during gear shift is enabled or the speed threshold is a second speed threshold when the engine speed regulation during gear shift is disabled;
compare a speed of the machine and the speed threshold; and
inhibit the directional shift for the machine based on comparing the speed of the machine and the speed threshold.

16. The machine of claim 15, wherein the first speed threshold is greater than the second speed threshold.

17. The machine of claim 15, wherein the transmission control system, when inhibiting the directional shift, is configured to transmit a signal to the engine control unit to reduce a speed of the engine.

18. The machine of claim 15, further comprising an indicator component configured to indicate that the directional shift is being inhibited.

19. The machine of claim 15, further comprising one or more controls that permit the engine speed regulation during gear shift to be enabled or disabled.

20. The machine of claim 15, wherein the machine includes at least one of:
- a compactor,
- a wheel dozer, or
- a wheel loader.

* * * * *